(12) United States Patent
de Jong et al.

(10) Patent No.: US 8,408,811 B2
(45) Date of Patent: Apr. 2, 2013

(54) FUSION-SPLICE FIBER OPTIC CONNECTORS AND RELATED TOOLS

(75) Inventors: Michael de Jong, Colleyville, TX (US); Daniel Leyva, Jr., Arlington, TX (US); Charles A. Yow, Jr., Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 1149 days.

(21) Appl. No.: 12/077,126

(22) Filed: Mar. 17, 2008

(65) Prior Publication Data

US 2009/0022457 A1 Jan. 22, 2009

Related U.S. Application Data

(60) Provisional application No. 60/959,702, filed on Jul. 16, 2007.

(51) Int. Cl.
*G02B 6/38* (2006.01)
(52) U.S. Cl. .......................................................... 385/69
(58) Field of Classification Search .............. 385/86–87, 385/69; 285/260
See application file for complete search history.

(56) References Cited

U.S. PATENT DOCUMENTS

| | | | |
|---|---|---|---|
| 4,598,974 A | 7/1986 | Munn et al. | 350/96.21 |
| 4,824,198 A | 4/1989 | Anderton | 350/96.21 |
| 4,877,303 A | 10/1989 | Caldwell et al. | 350/96.21 |
| 4,964,688 A | 10/1990 | Caldwell et al. | 350/96.2 |
| 5,115,483 A * | 5/1992 | Morency et al. | 385/60 |
| 5,611,012 A | 3/1997 | Kuchenbecker | 385/86 |
| 5,748,819 A | 5/1998 | Szentesi et al. | 385/60 |
| 5,825,962 A | 10/1998 | Walters et al. | 385/135 |
| 6,068,410 A | 5/2000 | Giebel et al. | 385/72 |
| 6,120,193 A | 9/2000 | Luther et al. | 385/99 |
| 6,152,609 A | 11/2000 | Dzyck et al. | 385/86 |
| 6,599,026 B1 * | 7/2003 | Fahrnbauer et al. | 385/77 |
| 6,715,933 B1 | 4/2004 | Zimmer et al. | 385/86 |
| 7,677,812 B2 * | 3/2010 | Castagna et al. | 385/69 |
| 2005/0213897 A1 * | 9/2005 | Palmer et al. | 385/95 |
| 2006/0120672 A1 * | 6/2006 | Cody et al. | 385/86 |
| 2007/0104425 A1 * | 5/2007 | Larson et al. | 385/86 |

FOREIGN PATENT DOCUMENTS

| | | |
|---|---|---|
| DE | 4307272 | 4/1994 |
| WO | WO2004/001472 | 12/2003 |
| WO | WO2008/030432 | 3/2008 |
| WO | WO2009/011799 | 1/2009 |

OTHER PUBLICATIONS

Patent Cooperation Treaty, International Search Report for International Application No. PCT/US2009/001525, Jun. 5, 2009, 2 pages.

\* cited by examiner

*Primary Examiner* — Ryan Lepisto
*Assistant Examiner* — Erin Chiem

(57) ABSTRACT

Fiber optic connectors having an optical fiber stub that is fusion-spliced for optical connection and related tools for the fiber optic connectors are disclosed. Specifically, the connector assembly for fusion-splicing includes a fiber optic connector having an optic fiber stub and a boot attachable to the fiber optic connector. The boot is configured to transfer the majority of the axial force from the fiber optic cable to the fiber optic connector. Specifically, a splice housing for housing the fusion splice is configured for attachment to an end of the boot for transferring forces from the fiber optic cable to the boot. Consequently, the boot preferably has an extensibility of less than about 2 millimeters under an axial load of about fifteen pounds to inhibit excess forces from acting on the optical fiber stub.

23 Claims, 17 Drawing Sheets

FUSION-SPLICE FIBER OPTIC CONNECTORS AND RELATED TOOLS

CROSS REFERENCE TO RELATED APPLICATIONS

This application claims benefit of U.S. Provisional Application Ser. No. 60/959,702, filed Jul. 16, 2007.

FIELD OF THE DISCLOSURE

The present disclosure relates to fiber optic connectors and related tools. More specifically, the present disclosure relates generally to fiber optic connectors having an optical fiber stub suitable for fusion-splicing for optical connection and related tools for the fiber optic connectors.

BACKGROUND OF THE DISCLOSURE

Field installable fusion-splice connectors that require dedicated fusion splicers for installation have been developed. One type of fusion splicer is designed for a fusion-splice connector using a stub optical fiber in an extended length ferrule. The extended length ferrule has a notch or hole cut near the middle where the fusion splice is made. The stub optical fiber ends at the notch or hole and the field fiber is inserted into the opposite end of the ferrule for fusion splicing with the field fiber. Simply stated, the fusion splice occurs at the notch or hole near the middle of the ferrule. In other words, the bore of the ferrule serves as the alignment member for the fibers to be joined, which eliminates the need for aligning V-grooves in the splicer, and allows a very short overall length finished connector (i.e., a length similar to a conventional epoxy/polish connector). Another type of fusion-splice connector uses a standard length ferrule with a short optical fiber stub that protrudes beyond the ferrule end. This type of fusion-splice connector has a special connector housing that surrounds the fusion splice for protecting the same. Thus, the overall length of this type of fusion-splice connector is longer than other fusion-splice connectors, making it bulky and difficult to route or store by the craft. Further, both fusion-splice connectors described include multiple components that must be installed in the field to complete the connector.

Fusion-splice connector designs have attempted to use a standard fusion splicer and eliminate the requirement of a dedicated fusion splicer, but have encountered difficulties meeting all of the requirements for the assembly. One such fusion-splice connecter design for use with a standard fusion splicer includes an extended length body to house the fusion splice, which allows for a long length fiber stub that can be used with standard splicing machines. In other words, this fusion-splice connector design uses a long optical fiber stub for working with the V-grooves on a standard fusion-splicer chuck to align the fibers during fusion splicing. These V-grooves require about 10 millimeters of bare optical fiber stub to extend from the ferrule or connector subassembly for fusion splicing. After fusion splicing, an extended length connector backshell or crimp body is attached for strain relieving the fiber optic cable. The added length of these fusion-splice connectors makes it difficult, if not impossible, to pass all of the Telcordia performance requirements. For instance, optical transmission under applied load is difficult to pass, due to the added moment arm of the longer connector body. Additionally, the extended length of this fusion-splice connector will not pass the Telcordia requirements for overall connector length. Moreover, these fusion-spliced connectors also have a large number of parts that must be installed in the field by craft, thereby making installation cumbersome.

Accordingly, there has been an unaddressed need for a fusion-splice connector that solves the problem of connector length/size with a simple design having fewer parts requiring assembly by the craft using a standard fusion splicer.

BRIEF SUMMARY OF THE DISCLOSURE

In various embodiments, the present disclosure provides fiber optic connectors that are installed upon one or more optical fibers by fusion splicing using a standard fusion splicer. In various embodiments, the connector is constructed from a standard connector (SC-type in the accompanying figures, although LC or other types may be utilized) with an optical fiber stub such as a 900 micron tight buffered optical fiber or bare optical fiber extending from the rear. The end of the optical fiber is stripped and cleaved in preparation for fusion splicing. The optical fiber stub extending from the rear of the fiber optic connector is protected by a boot that is mechanically attached to the fiber optic connector. The boot is designed to flex without appreciable stretching/elongation under axial loads since it carries (i.e., transfers) forces from the strength members of the fiber optic cable to the fiber optic connector. Specifically, the boot allows the strength member (s) of the fiber optic cable to be attached to the splice housing and support tensile load through the boot, instead of attaching the strength members directly to the fiber optic connector body. The end of the boot has a collar molded onto it for attaching it directly to the splice housing. Besides transferring loads therethrough, the splice housing also protects the fusion splice between the optical fiber stub and a field optical fiber. Additionally, the cable end of the splice housing may have barbs and/or a split collet for engaging and securing to the cable jacket. The strength members of the cable pass through a gap between the splice housings and are captured in the threads on the outside diameter by a nut that is screwed onto the splice housing. In other words, the nut compresses the collet/barbs into the cable jacket and secures (i.e., strain relieves) the strength members of the fiber optic cable. In one embodiment, a fusion-splice fiber optic connector includes a connector subassembly comprising a connector housing, one or more ferrules and an optical fiber stub; a boot associated with the connector subassembly; a splice housing defining an internal clearance for maintaining the fusion splice between the optical fiber stub and a field optical fiber. The splice housing also secures a portion of the boot and a portion of a cable using a securing component.

The fiber optic connectors are advantageous since the fiber optic connector may have a length that is similar to a conventional non-fusion spliced fiber optic connector because the fusion splice is moved to a location behind the flexible boot. The term "behind the boot" is defined herein as meaning that the fusion splice occurs both behind the fiber optic connector subassembly and the boot but still in close proximity to the fiber optic connector. Because the optical fiber stub extends beyond the boot when assembled, the fusion splice also extends beyond the boot. Moreover, the fiber optic connectors disclosed herein have a small number of parts for the craft to handle, with only the housing nut required to be pre-installed on the fiber optic cable. In other variations, a heat shrink tubing is provided pre-installed under the boot. The fiber optic connectors of the present invention are also advantageous because they do not required a dedicated splicer; but, instead may be installed using a conventional alignment splicer such as V-groove alignment splicers or active alignment splicers.

In further embodiments, a cushion may be included in the splice housing for securing and protecting the fusion splice from damage or rupture. The cushion may be a tape product used in addition to or as an alternative to the heat shrink tubing noted above. In one aspect, after the tape product has been inserted in the splice housing about the fusion splice, the tape product bonds to itself to provide a protective wrap about the fusion splice. In other aspects, a glue lined heat shrink may be provided for cable jacket retention.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure and are incorporated into and constitute a part of this specification. The drawings illustrate various embodiments of the disclosure and together with the description serve to explain the principals and operations of the disclosure.

BRIEF DESCRIPTION OF THE DRAWINGS

The foregoing and other features, aspects and advantages of the present disclosure may be better understood when the following detailed description is read with reference to the accompanying drawings, in which.

DETAILED DESCRIPTION OF THE DISCLOSURE

Figure 1:
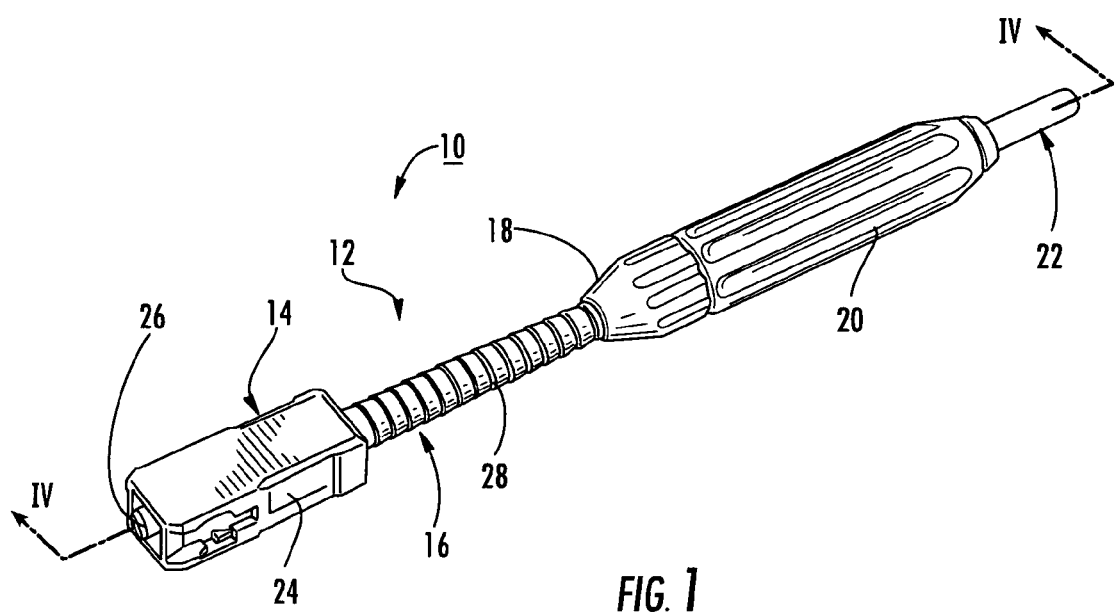
FIG. 1 is a perspective view of a fusion-spliced connector assembly according to one embodiment of the disclosure.

The present disclosure will now be described more fully hereinafter with reference to the accompanying drawings in which exemplary embodiments of the disclosure are shown. However, aspects of this disclosure may be embodied in many different forms and should not be construed as limited to the embodiments set forth herein. These exemplary embodiments are provided so that this disclosure will be both thorough and complete, and will fully convey the scope of the disclosure to those skilled in the art. Whenever possible, like reference numerals will be used throughout the detailed description of the disclosure to refer to like or similar elements of the various drawings.

The present disclosure generally provides various embodiments of a fiber optic connector assembly suitable for fusion splicing. The various embodiments are made from lightweight, economical materials and components that are simple to manufacture and are easily used in the field by a technician.

With reference now to FIG. 1, a completed fusion-spliced connector assembly 10 that is attached to a fiber optic cable 22. The fusion-spliced connector assembly 10 has a connector subassembly 12 generally including a fiber optic connector 14, which in this example is an SC-type connector, and a boot 16. As shown, the connector subassembly 12 is connected to a splice housing 18 by a securing component such as a compression nut 20, thereby securing boot 16 to splice housing 18 and strength members (not visible) to splice housing 18. The details of splicing, assembly, and attaching fiber optic cable 22 to connector subassembly 12 is described in detail below and by way of exemplary operations.

Figure 5:
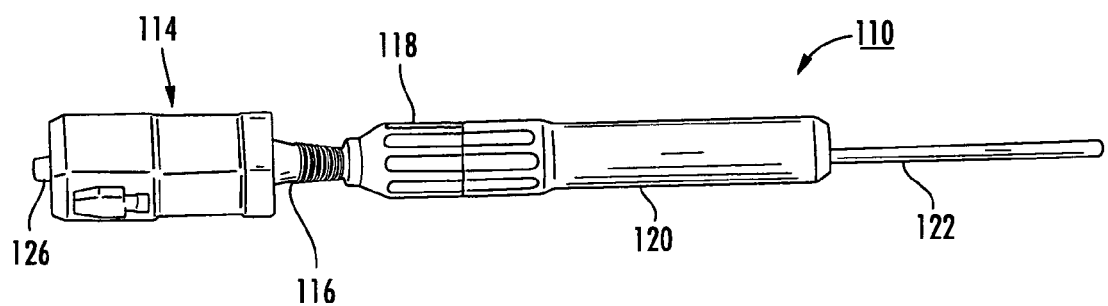
FIG. 5 is a perspective view of another fusion-spliced connector assembly according to the disclosure.

More particularly, FIG. 1 shows that fiber optic connector 14 is a standard SC fiber optic connector that includes a housing 24 having a ferrule 26 therein. Although, a SC fiber optic connector is shown, the concepts of the present invention are applicable to other fiber optic connectors such as LC, ST, FC, multiple fiber connectors, or the like. Fiber optic connector 14 is mechanically attached to boot 16 at a first end, and a second end extends toward splice housing 18 to protect a portion of an optical fiber such as a 900 micron tight buffer as discussed below. As shown in FIG. 1, boot 16 is tapered and defines one or more grooves 28 formed about an outer circumference of the boot 16 at the second end to allow the boot 16 to flex/bend without appreciable stretching such as up to 135 degrees or more. More particularly, the grooves 28 permit the boot 16 to flex/bend without buckling to meet the flex and 90° side pull requirements of Telcordia; however, boot 16 does not elongate substantially in length when subjected to axial loads. By way of example, a longitudinal extension of the boot 16 under a 15 pound axial load is about 2 millimeters or less. This is because unlike conventional connector boots, boot 16 of the invention is intended to transfer an axial load from the strength members of the fiber optic cable to fiber optic connector 14. Specifically, boot 16 is attached to splice housing 18 and the strength members of fiber optic cable 22 are secured to splice housing 18, instead of being strain relieved (i.e., crimped) directly to the fiber optic connector 14 like conventional fiber optic connectors. Boot 16 of this embodiment also has an extended length. Illustratively, boot 16 may have any suitable length. By way of example, boots of the present invention may have a length between about 10 and 100 millimeters, and more preferably between about 10 and 60 millimeters. Longer boots allow the fiber optic connector to extend beyond a typical fusion splicer during fusion splicing and/or allows boot 16 to be bent up to 180 degrees (FIG. 16) to inhibit interference issues during fusion splicing. Boots may have a relatively short length such as shown in FIG. 5, which allows the fiber optic connector to fit within the fusion splicer to inhibit interference issues during fusion splicing.

The boot construction is selected to have a predetermined strength and/or geometry so that it can carry the transferred axial load without appreciable stretching. In this example, the boot 16 is constructed of a semi-rigid material such as polybutylene terephthalate (PBT) having a wall thickness of about 0.8 millimeters, but other suitable wall thicknesses are possible. One suitable PBT is VALOX available from GE Plastics of Pittsfield, Mass. However, boot 16 may be manufactured from other suitable materials such as HYTREL or SURLYN brand thermoplastic polyester elastomers (TPE) available from DUPONT, or the EXXTRAL brand material (a polypropylene blend) available from Exxon-Mobil. Regardless of the type of material used, the flexural modulus of the material forming the boot 16 is preferably greater than about 30,000 psi and its tensile strength is preferably greater than about 5,000 psi.

Also shown in FIG. 1, a portion of the splice housing 18 that will be discussed below is abutted against the compression nut 20. In this example, the splice housing 18 and the compression nut 20 have knurled configurations or ridges to assist a technician in twisting or screwing the compression nut 20 and the splice housing 18 together.

Figure 2:
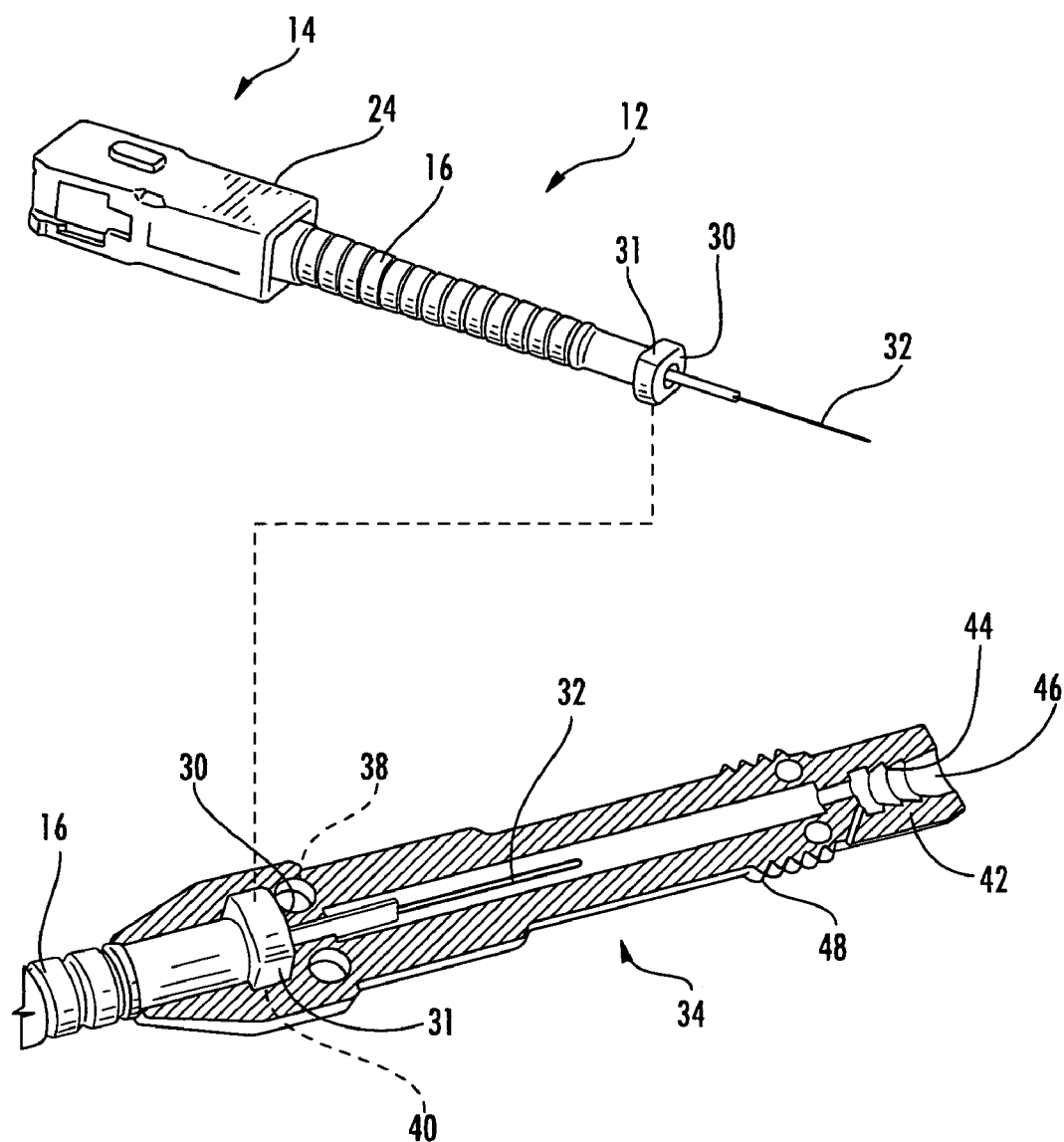
FIG. 2 are perspective views of components of the fusion-spliced connector assembly as in FIG. 1, particularly showing an exemplary assembly step of positioning the boot into the splice housing.

Turning now to FIG. 2, the rear end of connector assembly 12 is shown with a pre-determined length of optical fiber stub 32 factory stripped and cleaved in preparation for fusion splicing. By way of example, but not limitation, the optical fiber stub 32 may be any suitable optical fiber capable of being bent sharply such as SMF28XB or CLEARCURVE optical fibers available from Corning, Incorporated. In other embodiments, excess fiber length (EFL) is preloaded within boot 16 so that it can extend 2 millimeters or more before straining the optic fiber and impacting connector performance. Moreover, the optical fiber stub 32 may having a silane or carbon coating or treatment such as PROSAT or SATWIPES for increasing its durability. As shown, the rear end of the boot 16 from which the optical fiber stub 32 extends has a collar 30 for engaging a complementary structure of splice housing 18. More specifically, splice housing 18 is configured for capturing and securing collar 30 of boot 16 therein to transfer forces through boot 16 to fiber optic connector 14. As shown in this embodiment, splice housing 18 is a two-piece clamshell housing having a first portion 34 and a second portion 36 in which collar 30 is seated. First portion 34 of splice housing 18 includes a necked down portion behind the collar receiving portion for "grabbing", for instance, the 900 micron tight buffer of the optical fiber stub 32 that is discussed in detail herein with respect to FIGS. 13 and 14. The following discussion of elements and components of the first portion 34 of splice housing 18 generally applies to second portion 36 described below with respect to FIG. 3 unless expressly stated otherwise. Additionally, although splice housing 18 is shown and described as two-pieces it could have other configurations such as a one-piece design with a living hinge between the portions or be formed from more than two-pieces.

Figure 4:
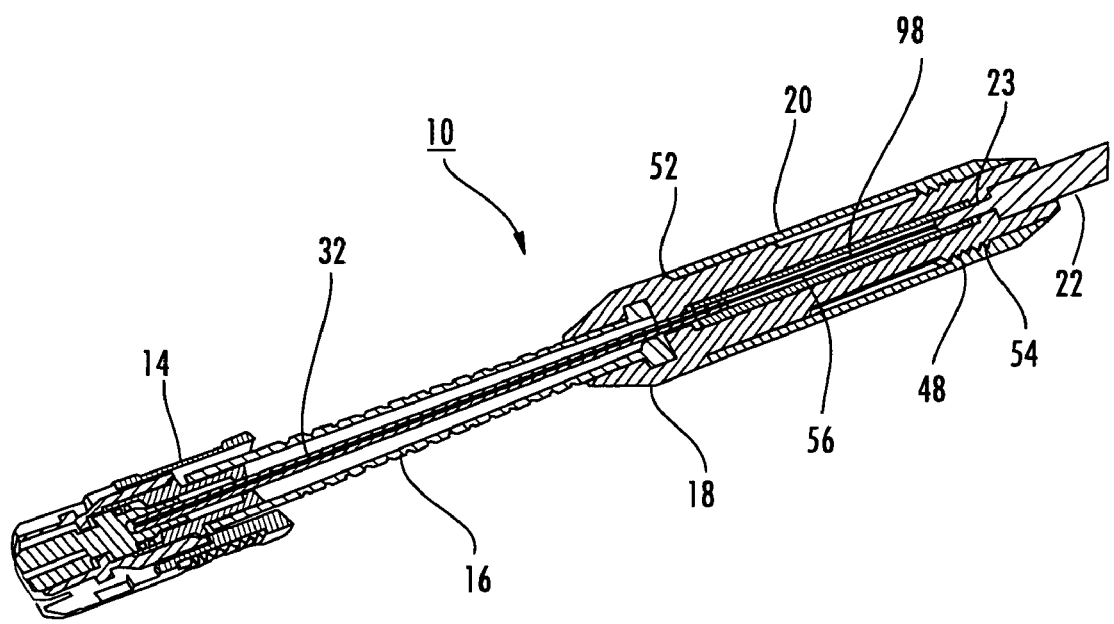
FIG. 4 is a cross-section of the fusion-spliced connector assembly of FIG. 1.

As further shown in FIG. 2, the first portion 34 of splice housing 18 includes a plurality of holes 38 into which rods, pins or other protrusions (not shown) of the second portion 36 may project for attaching the first and second portions 34, 36 together by press or snap fit interaction and/or with adhesives. First portion 34 also includes a groove 40 to accept the collar 30 of boot 16 to attach or anchor boot 16 to, or within, the first portion 34 as well as second portion 36 when the two portions 34, 36 are mated together. More particularly, collar 30 of boot 16 includes at least one flat surface 31 for seating into groove 40 to inhibit boot 16 from rotating within splice housing 18. As best shown by FIG. 4, an optical fiber 98 of fiber optic cable 22 will be joined or fused together with the fiber 32 prior to joining the first and second portions 34, 36 of splice housing 18 together. Thus, flat surface 31 inhibits undesirable rotation between the fusion spliced optical fibers of the fiber optic cable 22 and optical fiber stub 32, thereby protecting the fusion splice from rupture, stress, and the like. The first portion 34 also includes a collet 42 that defines a plurality of barbs 44 therein and an entry/exit way 46 through which fiber optic cable 22 will project. As shown, a plurality of external threads 48 are provided on the first portion 34 (and likewise on second portion 36) of splice housing 18 for receiving a compression nut 20 after the two portions 34, 36 are mated.

Figure 3:
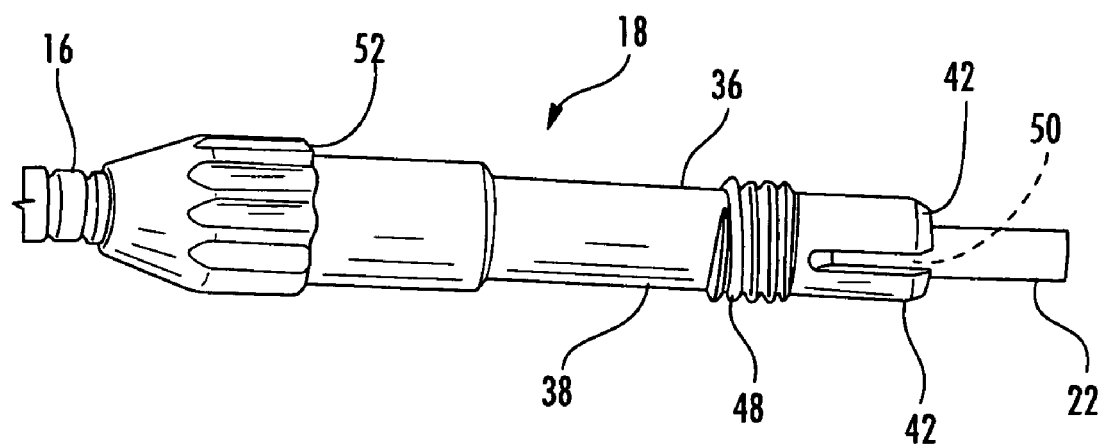
FIG. 3 is a perspective view of the splice housing of the fusion-spliced connector assembly as in FIG. 1.

Turning now to FIGS. 3 and 4, the two portions 34, 36 have been placed about collar 30 of boot 16 as noted above and are at least temporarily pressed together for further assembly such as attaching strength members of the fiber optic cable thereto. By way of example, a strength member 23 such as aramid yarns of fiber optic cable 22 (FIG. 4) may extend through and past a gap 50 to the exterior of first and second portions 34, 36. Alternatively, it is possible to attach strength members 23 to the splice housing 18 using a crimp ring (similar to a crimp element discussed with respect to FIG. 12 below). As shown, the fiber optic cable 22 exits from the collets 42, which are spaced apart in this exemplary split collet design by the gap 50. As further shown, a shoulder 52 is defined on the opposing end of the splice housing 18 to act as a stop for inhibiting further rotation and/or axial movement of the compression nut 20 as described with respect to FIG. 4 below.

FIG. 4 shows a cross-sectional view of fusion-spliced connector assembly 10 of FIG. 1. Like the optical fiber stub 32, coatings are removed from optical fiber 98 of fiber optic cable 22 and its end is cleaved before fusion splicing. Thus, the installed connector assembly 10 includes the fiber optic connector 14 from which optic fiber stub 32 extends through and past the end of the boot 16 into splice housing 18 where the optical fiber stub 32 is fused with the optical fiber 98 at a fusion splice 56. A heat shrink fusion splice protector may be applied over the optical fibers 32, 98 at fusion splice 56. As shown by FIG. 4, compression nut 20 is attached to splice housing 18 by an interaction of the threads 48 of the splice housing 18 and complementary threads 54 of compression nut 20. As noted above, the shoulder 52 of the splice housing 18 acts as a stop for further axial movement/engagement of compression nut 20 once the threading action is complete. Also as noted above with respect to FIG. 3, the gap 50 between the collets 42 is compressed together such that splice housing 18 grips the outer jacket of fiber optic cable 22 to inhibit a pistoning action of fiber optic cable 22 and possible stress and/or damage to fusion splice 56. Specifically, this compression of collets 42 by compression nut 20 pushes barbs 44 (FIG. 2) to engage/grip the outer jacket of fiber optic cable 22. The strength members 23, which extend around the exterior of first and second portions 34,36 are captured between the threads 48 to mechanically secure the strength member to splice housing 18 so that forces are transferred to the fiber optic connector 14 via boot 16. Those skilled in the art will appreciate that although mating of the splice housing 18 and the compression nut 20 have been described with respect to threads and threading actions, the components may be joined in various other manners such as by hooks, squeeze fits, press fits, snap fits, and the like.

Figure 7:
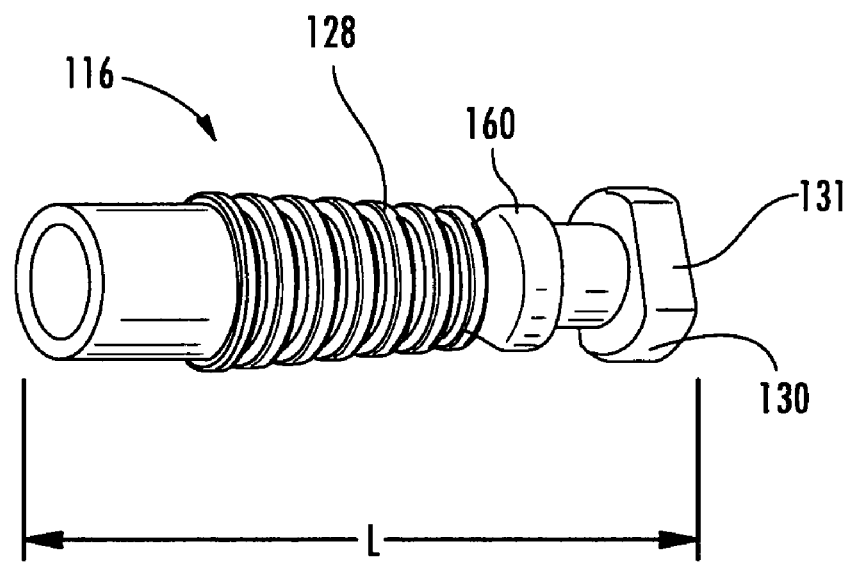
FIG. 7 is a perspective view of the boot used in the fusion-spliced connector assembly of FIGS. 5 and 6.

Turning now to another embodiment shown in FIG. 5, a fusion-spliced connector assembly 110 includes a fiber optic connector 114 that houses a ferrule 126. A boot 116, which will be described in detail below with respect to FIG. 7, is mechanically attached to the fiber optic connector 114 and attached to a splice housing 118 in a manner similar to the previously described embodiment. In this example, a connecting device such as a compression nut 120 is connected to splice housing 118 to compress the splice housing 118 about a portion of fiber optic cable 122 and to protect a fusion splice (cf fusion point 56 in FIG. 4) of the fusion-spliced connector assembly 110.

Figure 6:
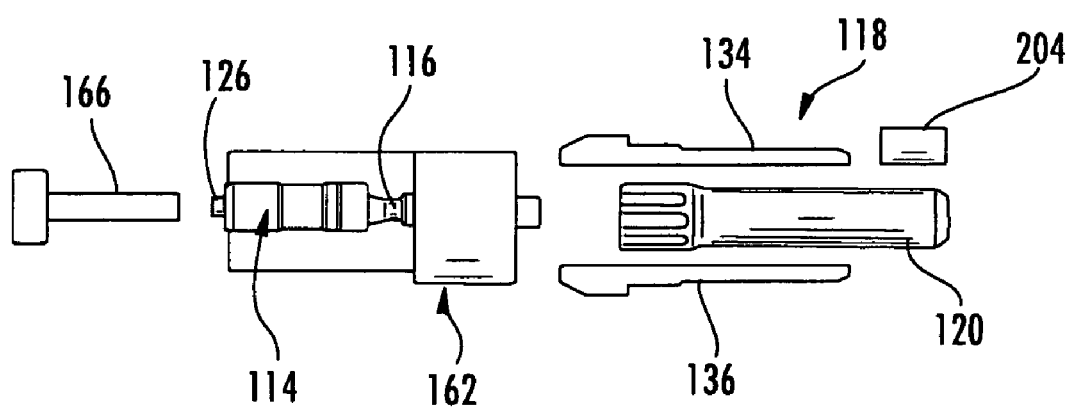
FIG. 6 is a partially exploded view of the fusion-spliced connector assembly as in FIG. 5.

FIG. 6 is an exploded view of the components of FIG. 5 and further illustrates an exemplary disposable load adapter 162 for transporting components of the connector assembly to the fusion splicer. As shown, fiber optic connector 114 and boot 116 are held in the load adapter 162. For an SC-type connector, a housing (not shown) may be provided as a portion of fiber optic connector 114 to complete the same. In this example, a dust cap 166 is provided to protect a ferrule 126 of fiber optic connector 114. Also shown are two portions 134, 136 of splice housing 118, as discussed above the splice housing can also have other configurations. As introduced above regarding FIG. 5, the compression nut 120 will slide over and compress the portions 134, 136 of splice housing 118 together. Also shown in FIG. 6, a jacket retention device 204 is provided to further lock down the cable jacket of fiber optic cable 122. The jacket retention device 204 may be a heat shrink element as described with respect to FIG. 12 below, or other suitable device.

FIG. 7 is a detailed view of boot 116 of FIG. 5, which generally speaking has a shorter length than boot 16. Boot 116 may be formed from any suitable material like blends of polypropylene or other materials, such as HYTREL, SURLYN, EXXTRAL, or other materials as introduced above. Boot 116 preferably is molded with a number of ribs 128. The ribs 128 and the suitable material provide boot 116 with sufficient flexibility, yet durability. Moreover, boot 116 is molded with a collar 130 that is received by the splice housing 118 as shown in FIG. 5. Also in this example, the boot 116 includes a flat 131 on the collar 130 to inhibit rotation of the boot 116 in splice housing 118. Also, a flange 160 is provided, which cooperates with the collar 130 to hold the boot 116 in place axially in splice housing 118. Boot 116 is considerably shorter than conventional boots for a similar connector. More specifically, the boot 116 has a length L, which is preferably between about 10 millimeters to about 30 millimeters such as about 20 millimeters, but other suitable lengths are possible. In different embodiments for a SC type connector, the boot has a length L of between about 10 millimeters and 60 millimeters such as 45 millimeters depending on the desired construction. Alternatively, the boot 116 may have other lengths for other connector types. For instance, an LC-type connector can have a boot with a length that is be shorter. The shorter length L for the boot makes the pigtail connector assembly 112 as shown in FIG. 5 significantly shorter than conventional arrangements, which permits a connector assembly 112 to fit into most fusion splicers without bending the boot out of the way. Thus, the compact boot 116 is allows the technician to make field terminations (i.e., fusion splices) easier since there are not interference problems. Further, it is easier to meet Telecordia flex requirements with a shorter boot.

Figure 8:
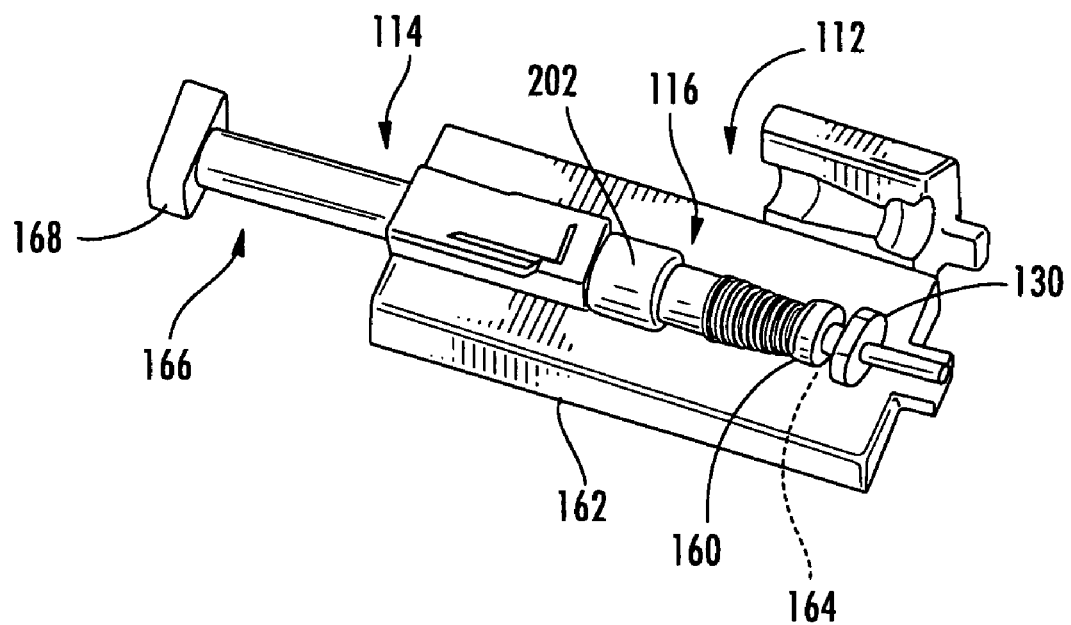
FIG. 8 is a perspective view of a disposable load adapter used to transport a connector assembly to a work station and to a fusion splicer to form the fusion-spliced connector assembly of FIG. 5.

FIG. 8 shows boot 116 assembled with fiber optic connector 114 and with a crimp element 202 for making attaching boot 116 to fiber optic connector 114. As shown, the assembly is placed in load adapter 162 for transporting the assembly to a fusion splicer such as the fusion splicer described below with respect to FIGS. 10 and 11. As introduced above, collar 130 and flange 160 are shown holding boot 116 in a flange aperture 164 of load adapter 162 for securing the assembly for transportation to the fusion splicer. Also shown, the dust cap 166 is attached for protecting the ferrule (not visible) of fiber optic connector 114. Moreover, the dust cap 166 includes a head 168, which is used for securing the dust cap 166 and the other components to the fusion splicer as discussed below.

Figure 9:
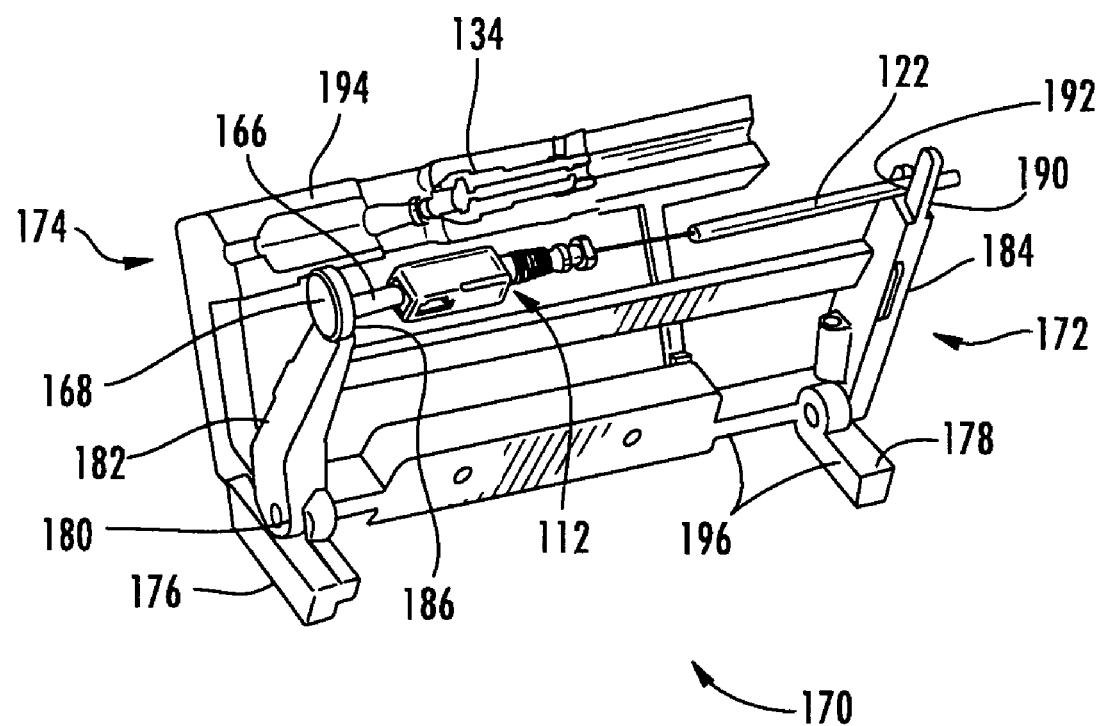
FIG. 9 is a perspective view of the work station for transferring the connector assembly and a fiber optic cable to a fusion splicer to splice the same, thereby forming the fusion-spliced connector assembly as in FIG. 5.
Figure 10:
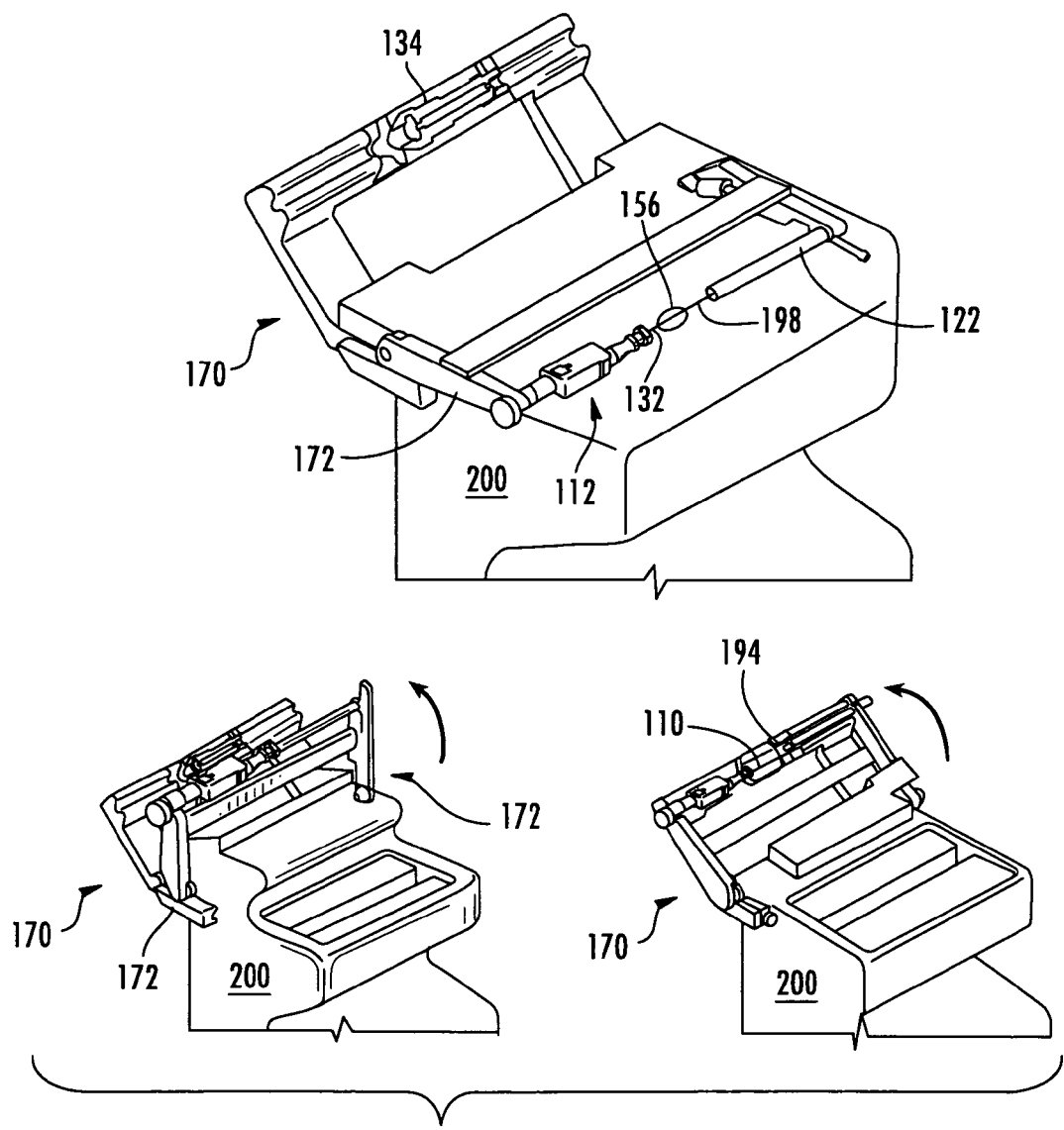
FIG. 10 are perspective views of the work station, particularly showing steps for forming the fusion-spliced connector assembly as in FIG. 5.
Figure 11:
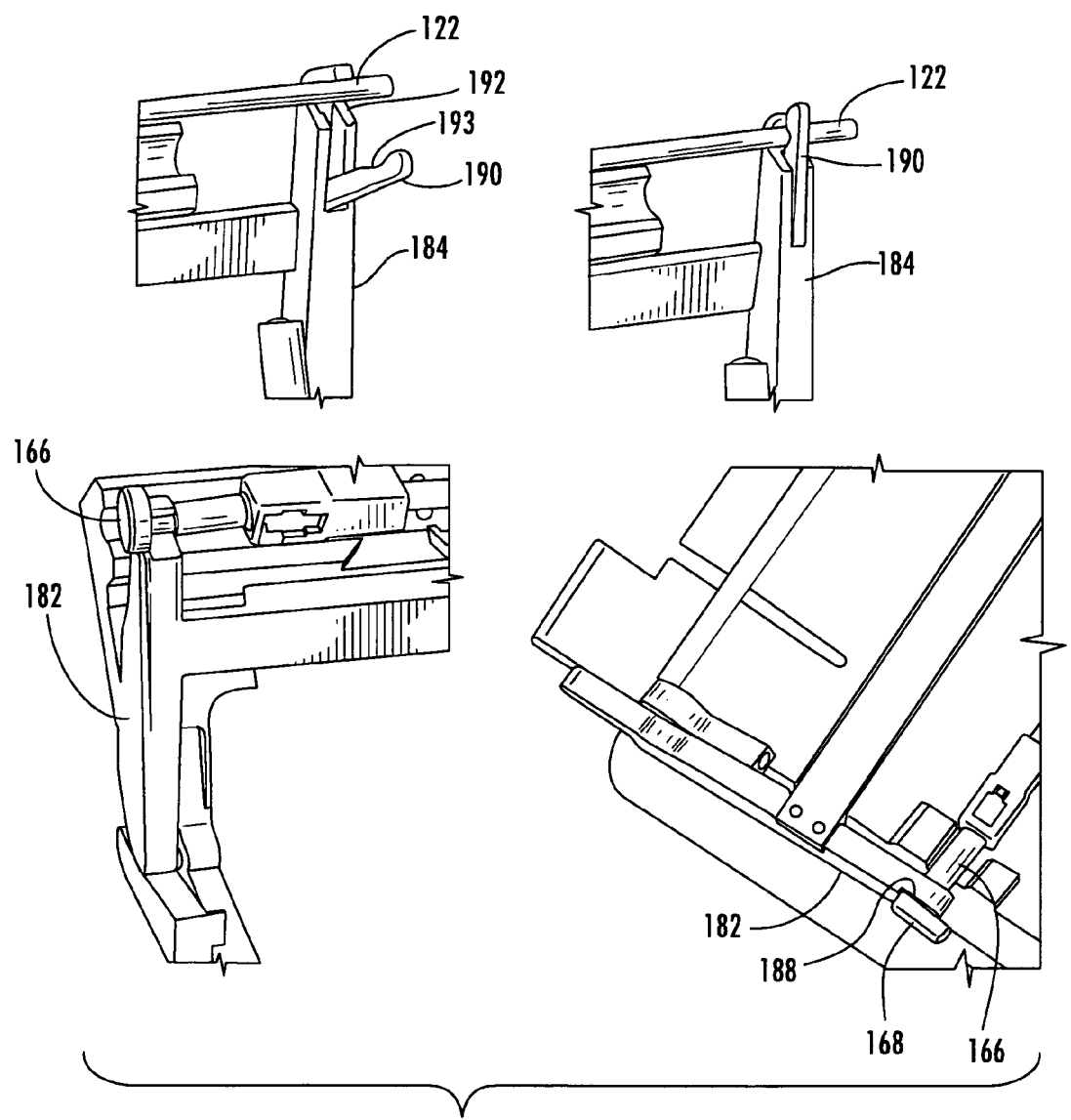
FIG. 11 are perspective detailed views of the work station of FIG. 10, particularly showing connections of the connector assembly and the fiber optic cable in the work station.

Turning now to FIGS. 9-11, a connector assembly station 170 is shown for transferring connector assembly 112 and dust cap 166 to a fusion splicer 200 having fusion control electronics operably connected to activate an electric arc welding system to supply high voltage for forming a fusion splice. With particular reference to FIG. 9, the connector assembly station 170 generally includes a pivot arm assembly 172 for holding connector assembly 112 and fiber optic cable 122 and a splice protector assembly 174 that holds first portion 134 of the splice housing. More particularly, the pivot arm assembly 172 includes a connector grip arm 182 and a cable grip 184. As shown, the connector grip 182 includes a recess 186 for cradling the head 168 of the dust cap 166. The cable grip 184 has a lever 190 that works in conjunction with a cable recess 192 to hold fiber optic cable 122 in place, axially aligned with connector assembly 112. As will be described below, once connector assembly 112 and fiber optic cable 122 are fused, the pivot arm assembly 172 will be pivoted toward the splice protector assembly 174 to place the completed assembly in first portion 134, which has been pre-positioned in an assembly pocket 194 to protect the fused assembly from damage or rupture during transportation.

FIG. 9 further shows that the pivot arm assembly 172 and splice protector assembly 174 are angled to provide easy access and working space for the technician. As shown, the pivot arm assembly 172 and splice protector assembly 174 are connected respectively to a base such as base legs 176 and 178. The base legs 176, 178 act as a stop for the pivot arm assembly 172 as described in greater detail below.

Also shown in FIG. 9, rotation mechanisms 180 allow the pivot arm assembly 172 to rotate toward the base legs 176, 178 or toward the splice protector assembly 174. The connector assembly station 170 also includes a plurality of accessory mounting mechanisms such as holes and rods 196 to attach the connector assembly station 170 to most fusion stations on the market.

FIG. 10 shows the connector assembly station 170 placed on the fusion station 200. In this example, the pivot arm assembly 172 has been rotated downward toward the fusion station 200 for electrode devices (not shown) to fuse together an optic optical fiber stub 132 of connector assembly 112 and an optic fiber 198 of fiber optic cable 122, thereby forming a fusion splice 156. Once fusion splice 156 is completed, the technician can rotate the arm 172 upward as shown by the bold arrows until the completed assembly 110 is cradled in first portion 134, which was pre-inserted in the assembly pocket 194. The technician may then apply the second portion 136 of the splice housing before removal from the fusion station 200 to proceed with installation of the fusion-splice connector assembly 110.

FIG. 11 most clearly shows aspects of the connector station 170 briefly introduced above with respect to the FIGS. 9 and

10. As shown in FIG. 11, fiber optic cable 122 is cradled by the cable recess 192 of the cable grip 184 and the lever 190, which has a lever indentation 193, is rotated to secure fiber optic cable 122. The lever 190 may be magnetized to remain in place (i.e., to not fall due to gravity). Additionally or alternatively, the lever 190 may include a detent mechanism (not shown) to prevent its movement until desired. As further shown, an indentation 188 is formed in the connector grip 182 to firmly hold the head 168 of the dust cover 166 in place. Alternately, a mechanism such as the cable grip 184 may be used to attach the dust cover 166.

Figure 12:
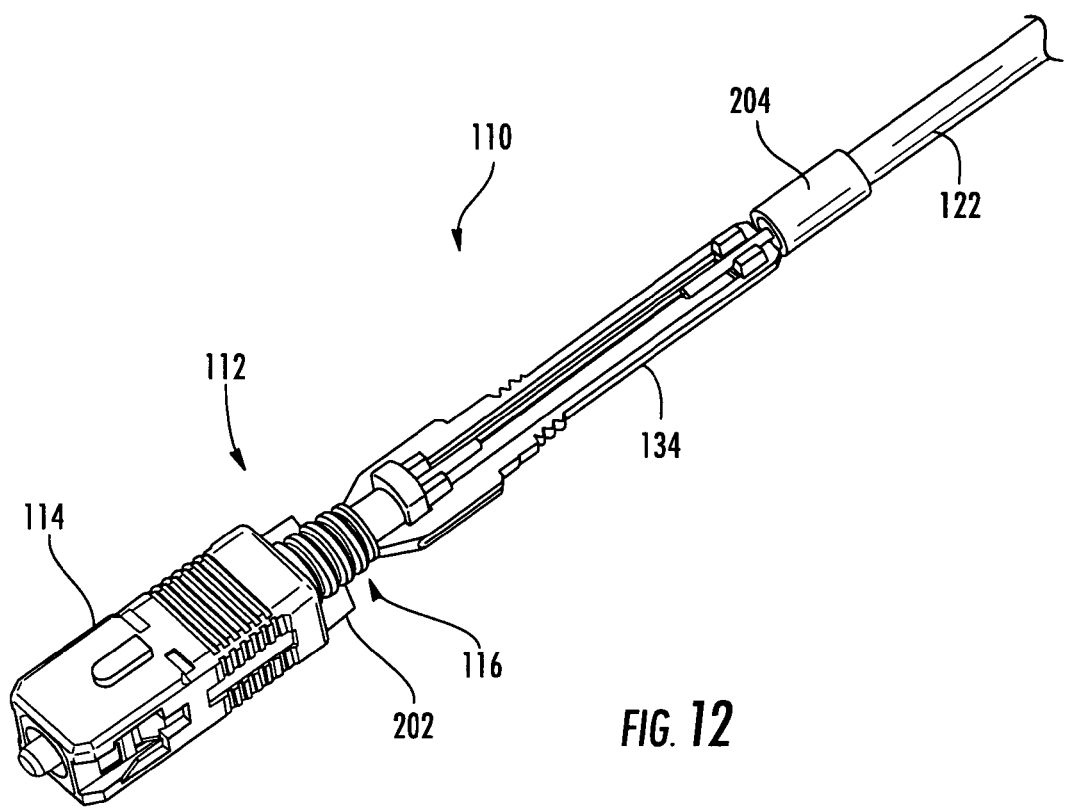
FIG. 12 is a perspective view of the fusion-spliced connector assembly of FIG. 5 shown in partial cross-section.

In FIG. 12, the completed fusion-spliced connector assembly 110 is shown in partial cross-section with the crimp element 202 in place about the flexible boot 116 adjacent fiber optic connector 114 of connector assembly 112 to further render the components stationary. As shown, the jacket retention device 204, which in this example may be a heat shrink material, is shrunk around an end of fiber optic cable 122 to further prevent axial movement or pistoning of fusion-spliced connector assembly 110 once the compression nut 120 (see FIG. 13) is applied over the splice housing. For illustration purposes, only the first portion 134 of the splice housing is shown. The compression nut 120 has an internal shoulder (FIG. 4) to engage the heat shrink tubing 204 and effect retention.

Figure 13:
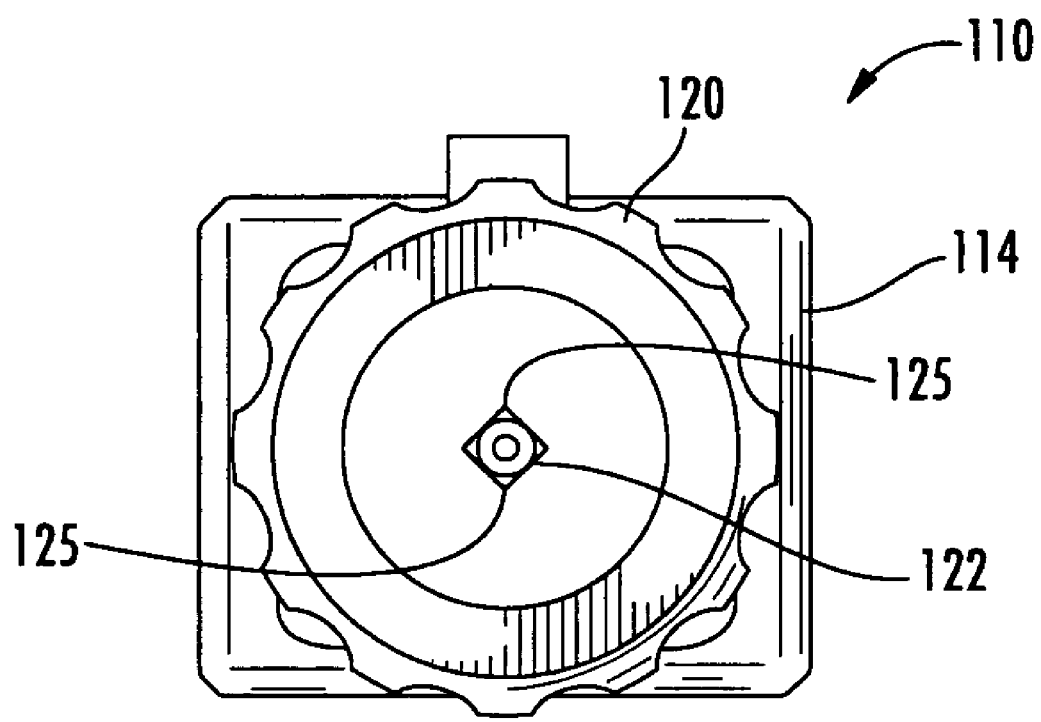
FIG. 13 is a rear end-view of the fusion-spliced connector assembly as in FIG. 12.

FIG. 13 shows a rear end view of the fusion-spliced connector assembly 110. In particular, the connector assembly 114 is shown in line with the knurled surface of the compression nut 120. Most clearly shown is the V shaped retention geometry for gripping the 900 micrometer buffer layer on the optical fiber, briefly introduced above, which is formed by opposing V-elements 125. The V-elements 125, which are most clearly shown in FIG. 14, securely hold in place buffered optical fiber of fiber optic cable 122 and a fusion splice (cf fusion splice 56 in FIG. 4) to prevent pistoning. Moreover, the V-shaped crimp engages and retains the buffered optical fiber, possibly including some deformation of the V-elements 125 to resist axial load and twisting forces.

Figure 14:
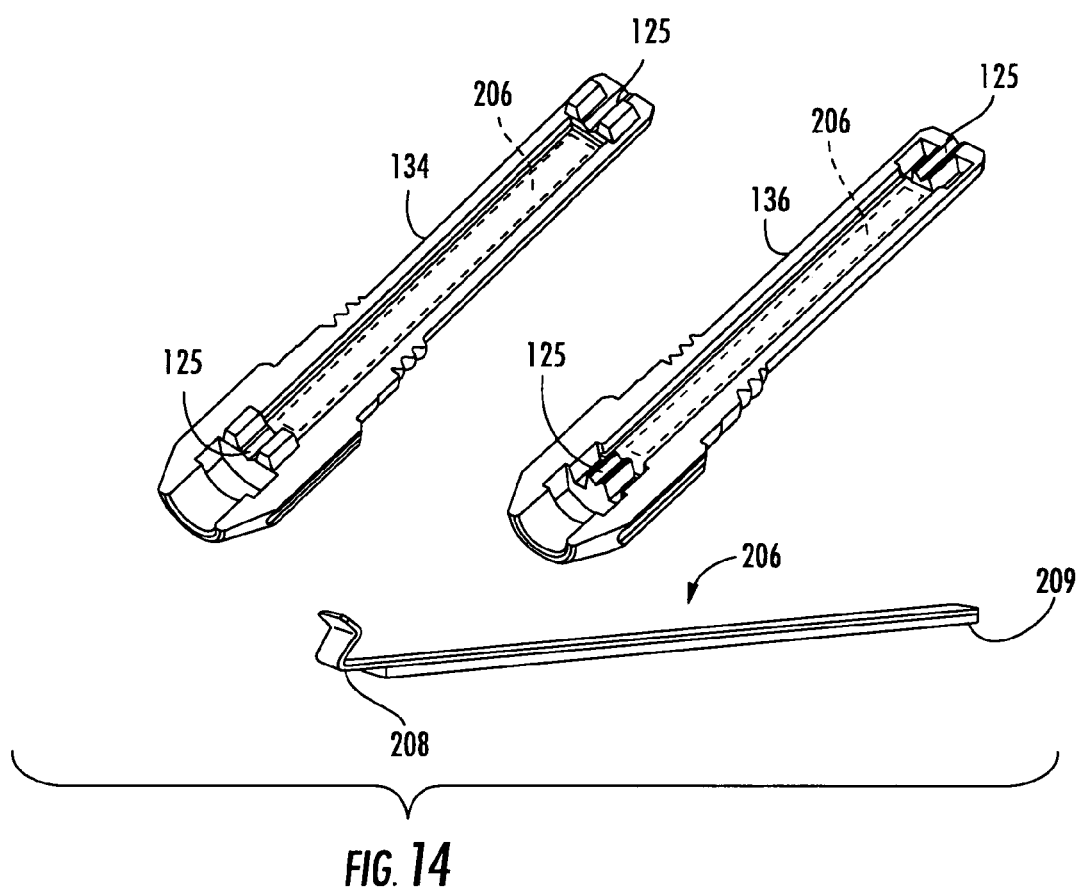
FIG. 14 is an exploded, perspective view of the exemplary splice housing of FIG. 5 showing the installation of a protective fiber cushion.

Turning now to FIG. 14, an additional feature of the disclosure is shown by way of a cushion 206 that is placed into the splice housing. Any suitable compressible material may be used for cushion 206, the example illustrated is a double-sided adhesive tape with a compressible core/backing of foam or other suitable material, which includes one or more covers 208 covering an adhesive 209. Although relative thicknesses are exaggerated in this example for clarity, the cushion 206 may be between about 0.75 mm and 1.25 mm in thickness. Other thicknesses and/or constructions are possible such as using a cushion on each portion of the splice housing. As shown, cover 208 is removed to expose the adhesive 209 to apply the tape 206 to an inner portion of either or both portions 134, 136. If applied to both portions 134, 136, the two portions of the cushion 206 can be fused together, or the cushion 206 may have properties that react or crosslink to bond the two portions of the cushion 206 together about the fusion splice (cf fusion point 56 in FIG. 4). Moreover, the compressible foam-backed tape used as cushion 206 increases the mechanical performance of the splice protector by creating a structural connection between the 900 micrometer buffer on the connector assembly side and fiber optic cable side. In other words, the fiber splice is protected from shock impact by the foam that makes up the cushion 206. By way of example, the cushion 206 may be a 3M brand VHB pressure sensitive adhesive tape, but the cushion 206 is not limited to this example and other brands may be used. In other variations, a cured silicone gel material may be used as an adhesive insert as an alternative or in addition to the the cushion 206.

Figure 15:
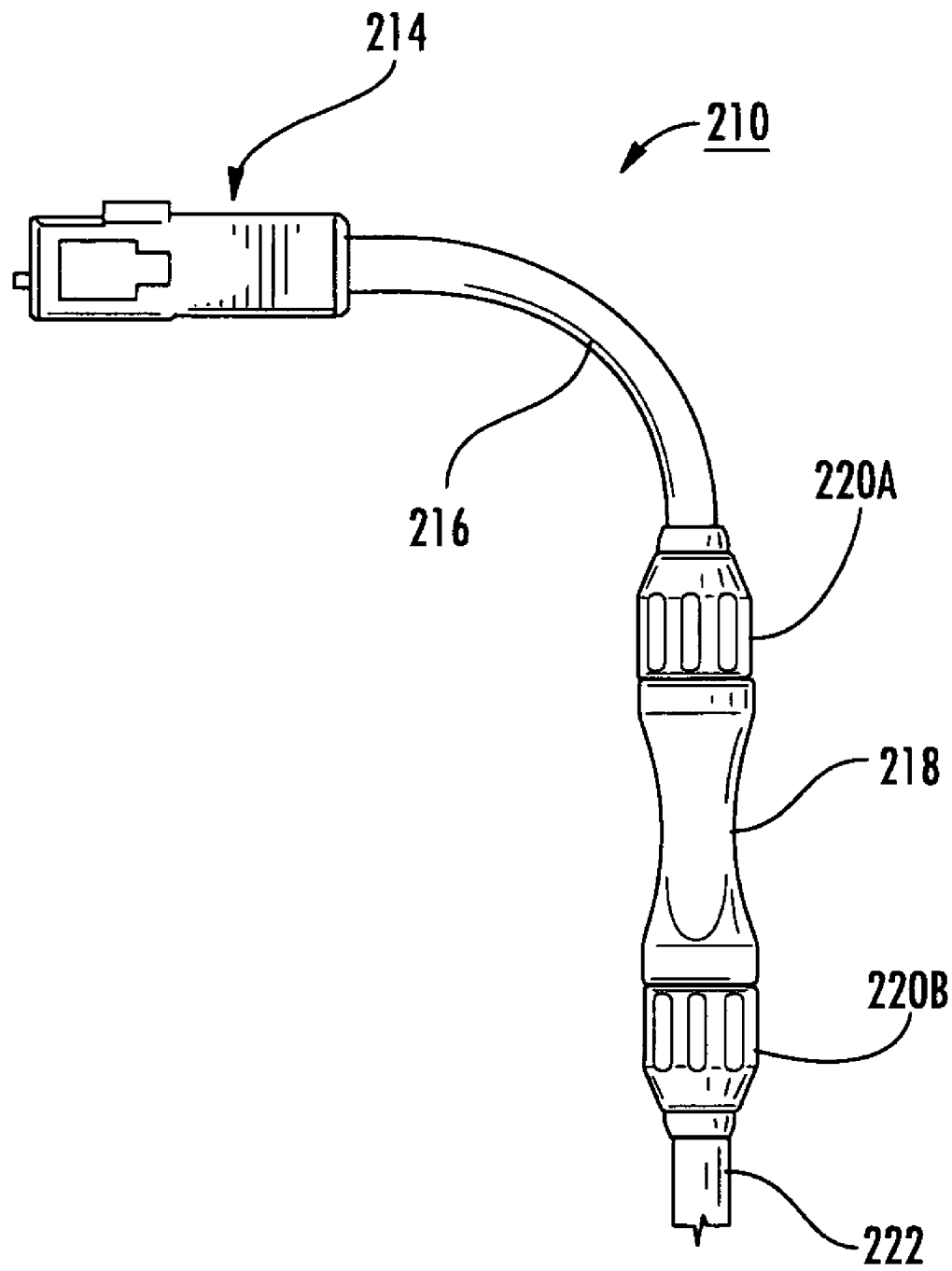
FIG. 15 is a plan view of a further embodiment of a fusion-spliced connector assembly according to the disclosure.

FIG. 15 shows an additional embodiment of a fusion-spliced connector assembly 210, which broadly includes a fiber optic connector 214, a boot 216, a splice housing 218, a compression nut 220A, a compression nut 220B and a fiber optic cable 222. In this example, the problem of loading a fully assembled, ready-to-splice connector into a standard fusion splicer is averted by using a relatively long boot. Also, the fusion-spliced connector assembly 210 may be safely moved from a splicing station to a heat shrink oven (not shown) or to an assembly station.

Figure 16:
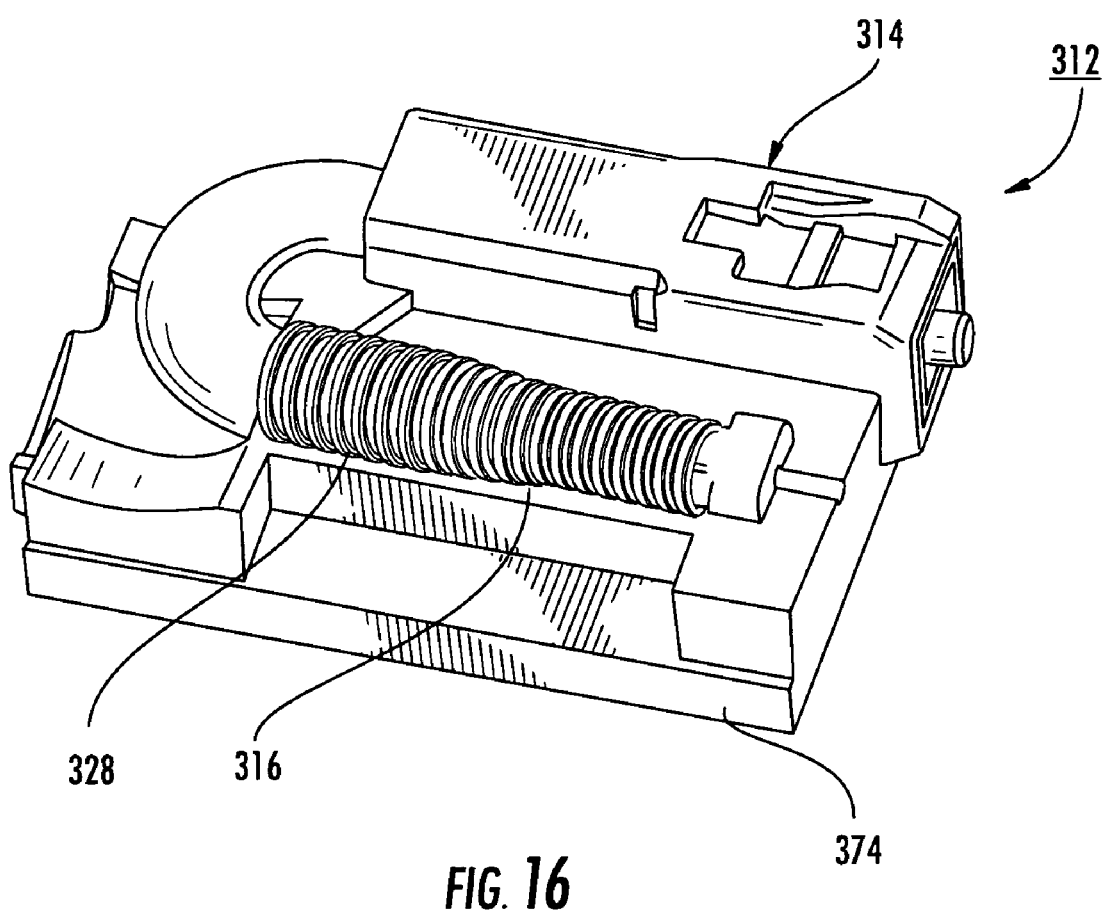
FIG. 16 is a perspective view of a load adaptor for use with a connector assembly in accordance with another embodiment of the disclosure.

Referring to FIG. 16, a load adaptor 374 is provided for use with a fiber optic connector pigtail assembly 312 as described above. As shown, the pigtail assembly 312 has a connector, such as an SC connector (although the connector may be any standard type connector), and a boot 316. The load adaptor 374 allows the fully assembled connector 314 to be loaded in available space on a standard splicer by bending the boot 316 of the connector 314 to about 180 degrees and retaining the boot 316 in a bent configuration.

Figure 17:
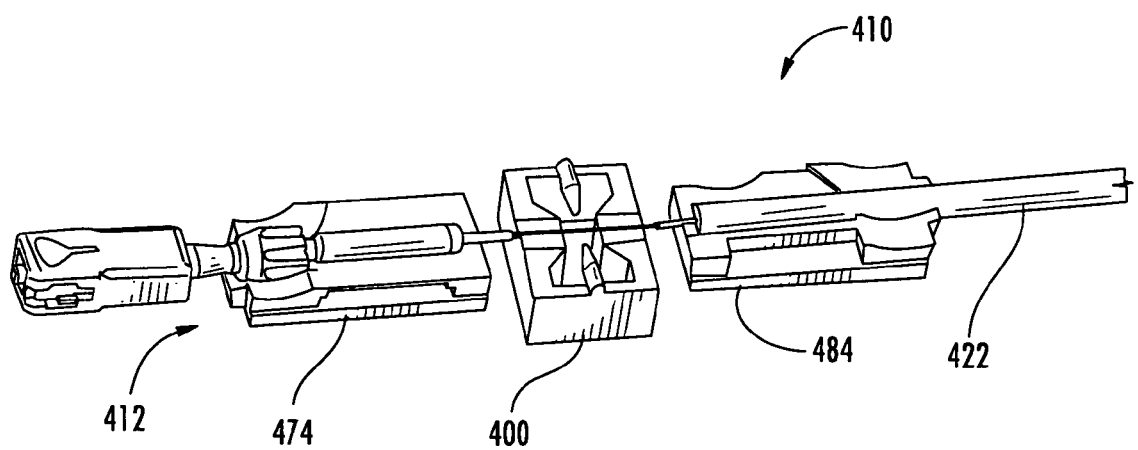
FIG. 17 is a perspective view of another embodiment of a load adaptor similar to FIG. 16 according to a further embodiment of the disclosure.
Figure 18:
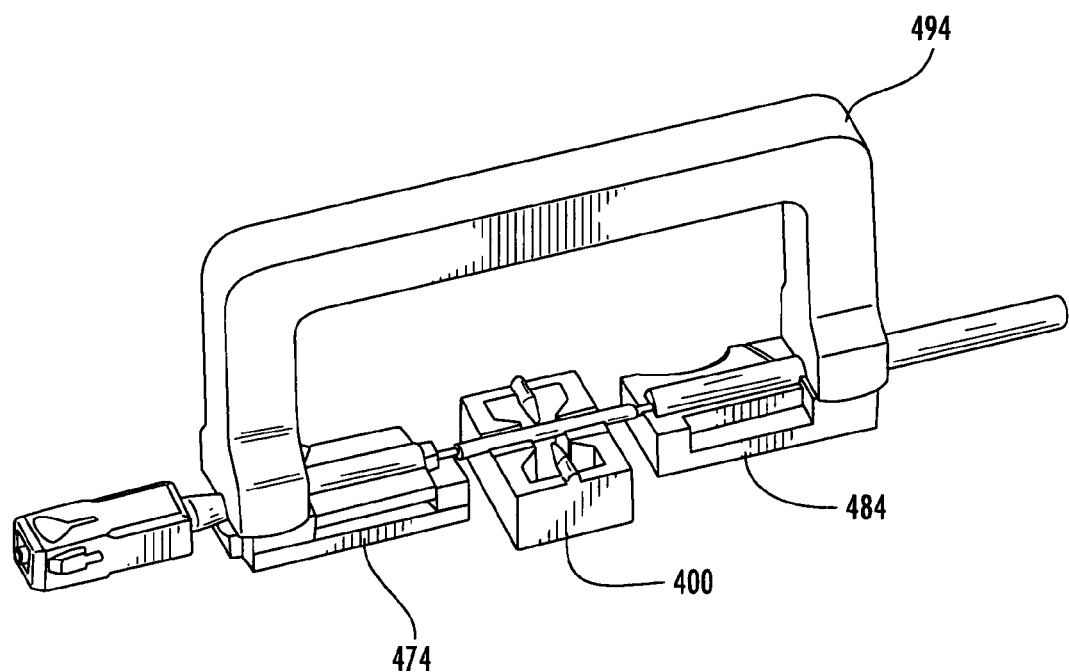
FIG. 18 is a perspective view of an attachable carrier arm for use with a load adaptor of FIG. 17.

FIGS. 17 and 18 show connector load adaptors 474, 484, which are similar in some ways to the connector load adaptor 374 described above with respect to FIG. 16. In this embodiment, a pigtail 412 and a cable 422 are loaded into their respective load adaptors 474, 484 for fusion at an electrode fusion station 400.

FIG. 18 particularly shows a carrier arm 494 attachable to the adaptors 474 and 484. The transfer handler 494 is useful depending on the connector used since the connector may have a heat shrink splice protector or an alternate type of splice protector such as semi-soft silicone gel installed in rigid substrate, or a UV adhesive, or a UV splice recoater. Thus, the handler 494 may be configured to move the load adaptors 474, 484 from the splicing station 400 to a heat shrink oven or to an assembly station (not shown) where the splice protector is assembled over the fiber.

Although examples have been described in such a way as to provide an enabling disclosure for one skilled in the art to make and use the disclosure, it should be understood that the descriptive examples of the disclosure are not intended to limit the disclosure to use only as shown in the figures. For instance, the connectors are not limited to any particular type of connector and may be SC, LC or other types of connectors. Moreover, a variety of suitable materials may be substituted for those examples noted above. It is intended to claim all such changes and modifications as fall within the scope of the appended claims and their equivalents. Thus, while exemplary embodiments of the disclosure have been shown and described, those skilled in the art will recognize that changes and modifications may be made to the foregoing examples without departing from the scope and spirit of the disclosure.

That which is claimed is:

1. A connector assembly for fusion-splicing the assembly behind the boot, comprising:
    a fiber optic connector having an optical fiber stub depending therethrough;
    a boot configured for being attached to the fiber optic connector, the optical fiber stub having a length that extends through and past an end of the boot when the boot is attached to the fiber optic connector so the fusion-splicing occurs behind the boot, wherein the boot has an extensibility of less than about 2 millimeters under an axial load of about fifteen pounds; and
    a splice housing configured for being attached to the boot, the splice housing adapted for protecting a fusion splice of the optical fiber stub.

2. The connector assembly according to claim 1, wherein the boot is bendable to at least about 135 degrees.

3. The connector assembly according to claim 1, wherein the boot is between about 10 millimeters to about 60 millimeters in length.

4. The connector assembly according to claim 1, wherein the boot includes a collar and the splice housing includes a complementary groove for securing the collar therein.

5. The connector assembly according to claim 1, wherein the boot includes a flat surface formed thereon and the splice housing includes a complementary groove for securing the flat surface therein for inhibiting rotation therebetween.

6. The connector assembly according to claim 1, wherein the splice housing includes two halves configured for holding a portion of the boot.

7. The connector assembly according to claim 1, further comprising a plurality of barbs in the splice housing, the barbs adapted to engage a cable jacket.

8. The connector assembly according to claim 1, further comprising a cushion adapted for protecting a fusion-splice of the optic fiber stub in the splice housing.

9. The connector assembly according to claim 1, further comprising a connecting device for attaching the splice housing to the boot.

10. A connector assembly for fusion-splicing the assembly behind the boot, comprising:
   a fiber optic connector having an optical fiber stub depending therethrough; and
   a boot having a first end and a second end, the first end being configured for attachment to the fiber optic connector and the second end having a collar, wherein the optical fiber stub having a length that extends through and past an end of the boot when the boot is attached to the fiber optic connector so the fusion-splicing occurs behind the boot; and
   a splice housing, the splice housing having a groove configured for securing the collar of the boot therein, wherein optical stub fiber extends into the splice housing,
   wherein the boot having an extensibility of less than about 2 millimeters under an axial load of about fifteen pounds.

11. The connector assembly according to claim 10, wherein the boot is between about 10 millimeters to about 60 millimeters in length.

12. The connector assembly according to claim 11, further comprising a cushion adapted for protecting a fusion-splice of the optic fiber stub in the splice housing.

13. The connector assembly according to claim 10, further comprising a splice housing having at least two pieces.

14. The connector assembly according to claim 13, further comprising a tape adapted for protecting a fusion-splice of the optical fiber stub within the splice housing.

15. The connector assembly according to claim 10, wherein the splice housing includes a compression nut.

16. A fusion-spliced connector assembly having the fusion-splice behind the boot, comprising:
   a fiber optic connector having an optical fiber stub extending therethrough;
   a boot having a longitudinal axis with a first end and a second end, the first end of the boot being configured for attachment to the fiber optic connector and the second end of the boot having a collar, wherein the optical fiber stub has a length that extends through and past an end of the boot when the boot is attached to the fiber optic connector so the fusion-splicing occurs behind the boot, wherein the boot has an extensibility of less than about 2 millimeters under an axial load of about fifteen pounds.

17. The fusion-spliced connector assembly according to claim 16, the boot having a plurality of grooves defined therein that enable the boot to bend to about 90 degrees or more.

18. The fusion-spliced connector assembly according to claim 16, wherein the collar has at least one flat surface that is generally parallel to the longitudinal axis of the boot.

19. The fusion-spliced connector assembly according to claim 16, wherein the boot is about 10 millimeters to about 60 millimeters in length.

20. The fusion-spliced connector assembly according to claim 16, further comprising a splice housing configured for being secured about the collar of the boot, the collar and the splice housing cooperable to resist axial and rotational forces to inhibit the application of forces to a fused end of the optical fiber stub.

21. The fusion-spliced connector assembly according to claim 20, further comprising a tape disposed in the splice housing, the tape configured to bond about the fused end of the optical fiber stub.

22. The fusion-spliced connector assembly according to claim 16, further comprising a securing component for securing the splice housing about the boot.

23. The fusion-spliced connector assembly according to claim 16, further comprising a securing component configured for securing the splice housing about the boot, the securing component being one of a compression nut or a shrink element configured for capturing a portion of a cable strength member.

* * * * *